United States Patent
Balslink

(10) Patent No.: US 10,030,975 B2
(45) Date of Patent: Jul. 24, 2018

(54) SENSOR AND METHOD FOR OPERATING A SENSOR

(75) Inventor: Thorsten Balslink, Kirchentellinsfurt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1973 days.

(21) Appl. No.: 13/322,331

(22) PCT Filed: Apr. 6, 2010

(86) PCT No.: PCT/EP2010/054500
§ 371 (c)(1),
(2), (4) Date: Feb. 8, 2012

(87) PCT Pub. No.: WO2010/136246
PCT Pub. Date: Dec. 2, 2010

(65) Prior Publication Data
US 2012/0136632 A1    May 31, 2012

(30) Foreign Application Priority Data
May 27, 2009 (DE) .................. 10 2009 026 508

(51) Int. Cl.
*G06F 15/00* (2006.01)
*G01C 19/56* (2012.01)

(52) U.S. Cl.
CPC .................................. *G01C 19/56* (2013.01)

(58) Field of Classification Search
CPC ................ G01C 19/56; G01C 19/5726; G01C 19/5719; A61B 5/14552; G01F 1/8436
(Continued)

(56) References Cited

U.S. PATENT DOCUMENTS 4,668,917 A * 5/1987 Levine ................. H03K 23/662
                                                    327/12
5,361,036 A * 11/1994 White ................ G01C 19/5607
                                                    329/356
(Continued)

FOREIGN PATENT DOCUMENTS

JP      9-281138      10/1997
JP    2001-264132     9/2001
(Continued)

OTHER PUBLICATIONS

International Search Report for PCT/EP2010/054500, dated Jul. 23, 2010.

*Primary Examiner* — Roy Y Yi
*Assistant Examiner* — Jeffrey Aiello
(74) *Attorney, Agent, or Firm* — Norton Rose Fulbright US LLP; Gerard Messina

(57) ABSTRACT

A sensor (100, 200) for measuring a variable generates a sensor signal (S), oscillates at a drive frequency ($f_x$), and includes: a rate demodulator (135), which demodulates the sensor signal (S) by multiplying it by a first demodulation signal, in order to generate a rate signal ($R_1$), which contains information about the measured variable to be measured; a quadrature demodulator (140), which demodulates the sensor signal (S) by multiplying it by a second demodulation signal shifted by 90° with respect to the first demodulation signal, to generate a quadrature signal ($Q_1$); and an analysis circuit (170), which determines whether the quadrature signal ($Q_1$) or a signal ($Q_2$) derived therefrom is subject to a periodic oscillation and, if a periodic oscillation is present, outputs a status signal ($X_{st}$) having a value which indicates that the instantaneous rate signal ($R_1$) is influenced by an external interference acting on the sensor (100, 200).

10 Claims, 11 Drawing Sheets

(58) Field of Classification Search
USPC ......... 73/504.12, 1.37, 1.77, 504.02, 507.03; 329/302, 307, 315, 304; 702/96, 116, 702/145, 189, 104
See application file for complete search history.

(56) References Cited

U.S. PATENT DOCUMENTS

| | | | | |
|---|---|---|---|---|
| 5,459,575 A | * | 10/1995 | Malvern | G01C 19/72 356/463 |
| 5,586,147 A | * | 12/1996 | Kreuzgruber | H03D 3/18 329/304 |
| 5,764,705 A | | 6/1998 | White | |
| 5,983,718 A | * | 11/1999 | Wyse | G01C 19/5776 702/147 |
| 6,672,159 B2 | * | 1/2004 | Schmid | G01C 19/56 310/319 |
| 2003/0121307 A1 | * | 7/2003 | Schmid | G01C 19/56 73/1.77 |
| 2004/0178845 A1 | * | 9/2004 | Kouwenhoven | H03D 3/007 329/304 |
| 2005/0125167 A1 | * | 6/2005 | Lesjak | G01F 1/849 702/45 |
| 2006/0191338 A1 | * | 8/2006 | Willig | G01C 19/5755 73/504.12 |
| 2006/0238260 A1 | * | 10/2006 | Demma | G01C 19/56 331/10 |
| 2008/0109190 A1 | * | 5/2008 | Bauer | B60R 21/0134 702/189 |
| 2008/0190200 A1 | * | 8/2008 | Caminada | G01C 19/5726 73/504.12 |
| 2009/0223276 A1 | * | 9/2009 | Rudolf | G01C 19/5726 73/1.37 |
| 2009/0243633 A1 | * | 10/2009 | Brasseur | G01D 5/2405 324/681 |
| 2009/0319212 A1 | * | 12/2009 | Cech | B60R 21/0136 702/65 |
| 2012/0160036 A1 | * | 6/2012 | Henry | G01F 1/8404 73/861.356 |

FOREIGN PATENT DOCUMENTS

| | | |
|---|---|---|
| JP | 2005-331449 | 12/2005 |
| JP | 2006-514749 | 5/2006 |
| JP | 2007-139595 | 6/2007 |
| WO | WO 2005/001382 | 1/2005 |
| WO | WO 2005/080919 | 9/2005 |
| WO | WO 2009/037499 | 3/2009 |
| WO | WO 2009/062786 | 5/2009 |

* cited by examiner

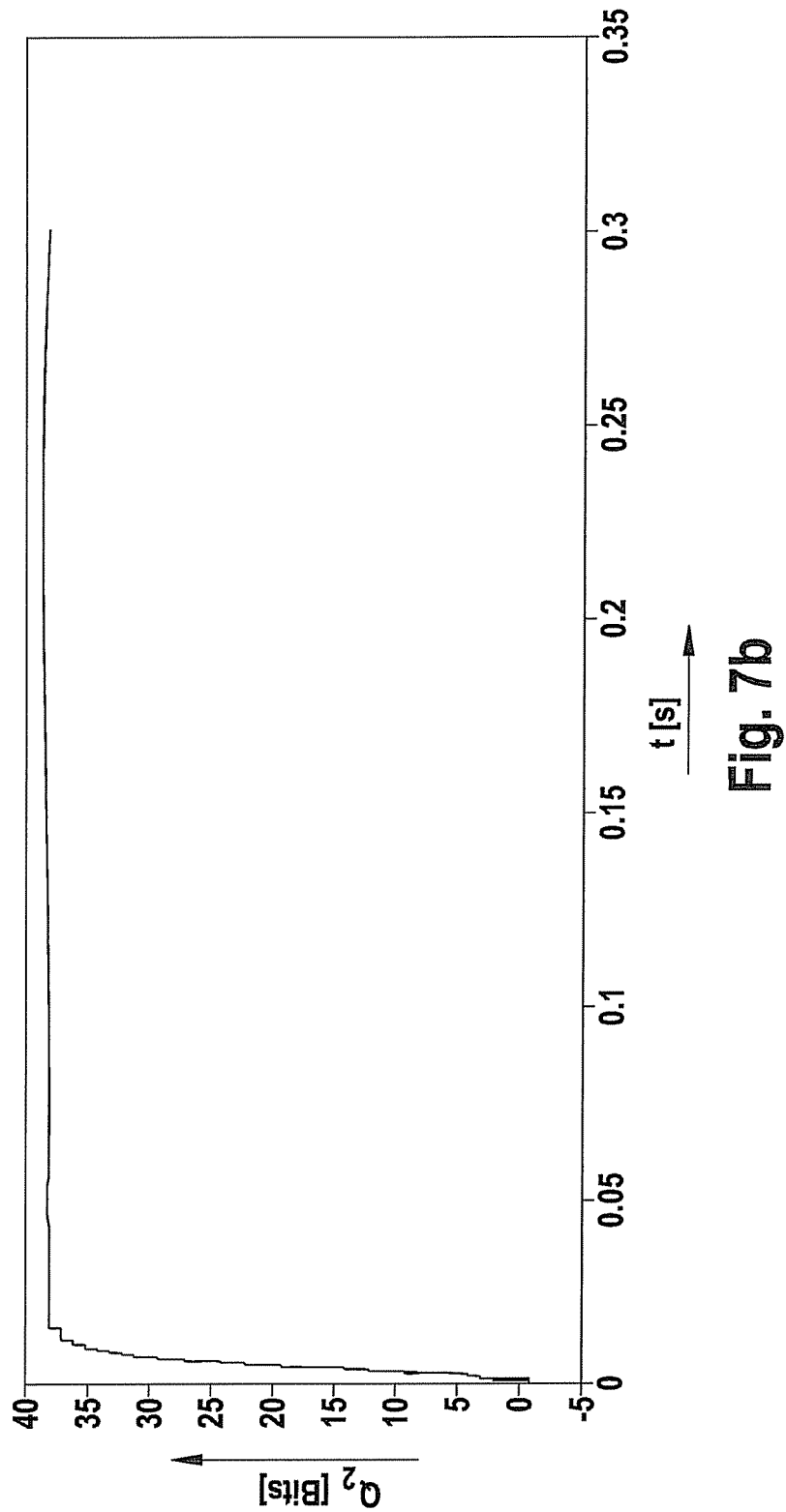

SENSOR AND METHOD FOR OPERATING A SENSOR

FIELD OF THE INVENTION

The present invention relates to a sensor, in particular a yaw rate sensor.

BACKGROUND INFORMATION

Micromechanical yaw rate sensors are used in the automotive field, for example, in electronic stability program (ESP) systems, for rollover sensing, or for navigational purposes. The function of the yaw rate sensor is the correct measurement of the automobile movement around a rotational axis.

A typical micromechanical yaw rate sensor normally includes an oscillating body, which is situated so it is movable on a substrate, and may be set into an oscillating movement in relation to the substrate at a drive frequency $f_x$. A rotary motion of a rotatable body, on which the yaw rate sensor is fastened, which is nonparallel to the oscillating movement induces a Coriolis force on the oscillating body, by which the oscillating body is additionally deflected. With the aid of measuring electrodes, this additional deflection may be detected capacitively and evaluated with respect to a variable describing the rotary motion of the rotatable body. Such a variable is a yaw rate of the rotary motion of the rotatable body, for example.

In the above-described measurement principle, linear (i.e., non-rotational) accelerations or vibrations on the rotatable body also cause a deflection of the measuring electrodes using a force which acts parallel to the Coriolis force. Various methods are known for differentiating rotary motions from such a linear acceleration.

Firstly, coupling two yaw rate sensor elements designed as linear oscillators in such a way that their oscillating bodies oscillate antiparallel to one another is known. In such a system, a linear acceleration or vibration (without a rotational component) results in forces having identical force vectors acting on the measuring electrodes, while, in contrast, in the case of a rotary motion, the force vectors of the Coriolis forces acting on the measuring electrodes are opposite to one another. If the output signals of the two sensor elements are subtracted from one another, the (in-phase) signal components of the two sensor elements, which are caused by linear acceleration or vibration, cancel one another out, while, in contrast, the (counter-phase) signal components, which are caused in the case of a rotary motion by Coriolis forces, do not cancel one another out through the subtraction. The influence of linear accelerations or vibrations on the sensor may thus be compensated for.

However, complete compensation occurs in such a system only if the two sensor elements are laid out perfectly symmetrically to one another. Because of manufacturing tolerances, and the like, however, certain asymmetries are unavoidable, so that a differential signal arises in the case of a linear interference, which is typically not differentiable from yaw rate signals.

A low-pass filter provided on the output side may be used for the purpose of filtering out such signal components caused by linear interference. However, the problem exists that in the event of vibrations having a frequency which is approximately equal to drive frequency $f_x$ of the sensor, a sideband arises, which may pass through the low-pass filter and may therefore be incorrectly interpreted as a rotational component. In other words, a possibility of interference exists in the event of vibrations in a frequency range of drive frequency $f_x$ plus/minus the cutoff frequency of the output-side low-pass filter.

In order to counteract the possibility of interference in this frequency range, damping of the external vibrations may be provided in this frequency range, e.g., by a suspension having suitable spring elements. However, such measures are complex and also cannot achieve complete compensation of the vibrations.

SUMMARY OF THE INVENTION

It is therefore an object of the present invention to provide a sensor which is insensitive with respect to external interference, in particular with respect to external vibrations.

Accordingly, in an example embodiment of the present invention, a sensor for measuring a measured variable is provided, which generates a sensor signal, and which oscillates at a drive frequency, the sensor including the following:

a rate demodulator, which demodulates the sensor signal by multiplying it by a first demodulation signal, in order to generate a rate signal from the sensor signal, which contains information about the measured variable to be measured;

a quadrature demodulator, which demodulates the sensor signal by multiplication by a second demodulation signal shifted by 90° with respect to the first demodulation signal, to generate a quadrature signal from the sensor signal; and an analysis circuit, which determines whether the quadrature signal or a signal derived therefrom is subject to a periodic oscillation and, if a periodic oscillation exists, outputs a status signal having a value which indicates that the instantaneous rate signal is influenced by an external interference acting on the sensor.

When an external interference acts on the sensor, in particular an external vibration in a specific frequency range, this may be reflected in a periodic oscillation of the quadrature signal or a feedback signal derived therefrom. The sensor according to an example embodiment of the present invention therefore infers the existence of an external interference from such a periodic oscillation and outputs a status signal, which indicates that the currently output measured value is subject to error. This status signal may be provided to downstream systems, for example, an ESP system in a motor vehicle, in which the sensor is provided, so that it is possible to prevent decisions from being made on the basis of incorrect or corrupted measured values.

The sensor may further have a quadrature controller, which receives the quadrature signal and generates a feedback signal, which is fed back into the sensor to regulate the quadrature signal to essentially zero, the analysis circuit determining whether this feedback signal is subject to a periodic oscillation. In this case, it is advantageous if the status signal is further supplied to the quadrature controller and the quadrature controller clamps the feedback signal at its instantaneous value, when the status signal jumps to a value which indicates that the instantaneous rate signal is influenced by an external interference acting on the sensor. In this way, it is possible to prevent a quadrature signal based on an external interference from being fed back into the measuring section of the sensor and influencing the measurement.

Furthermore, the sensor advantageously includes a correction circuit, to which the status signal and the rate signal are supplied, and which, in the case that the status signal's value indicates that the instantaneous rate signal is influenced by an external interference acting on the sensor, subjects the rate signal to a correction. Therefore, in case of an external interference, the effect of the interference on the rate signal may be compensated for and a corrected rate signal may be output.

Such a correction of the rate signal may be implemented, for example, by including in the sensor the following:
- a phase shifter, which phase-shifts the quadrature signal by 90° and outputs a quadrature signal phase-shifted by 90°;
- a subtracter, which calculates the difference between the phase-shifted quadrature signal and the rate signal and outputs it as a differential signal; and
- a multiplexer, which outputs either the rate signal or the differential signal calculated by the subtracter as a function of the status signal.

The sensor may be designed as a yaw rate sensor, for example, which includes an oscillating body, which may be set into oscillation in relation to a substrate at the drive frequency. In this case, the yaw rate sensor is insensitive in particular with respect to external vibrations at a frequency which is close to the drive frequency of the oscillating body.

A method according to an example embodiment of the present invention for operating a sensor includes the following steps:
- generating a sensor signal which oscillates at a drive frequency;
- demodulating the sensor signal by multiplying it by a first demodulation signal, in order to generate a rate signal from the sensor signal, which contains information about the measured variable to be measured;
- demodulating the sensor signal by multiplying it by a second demodulation signal shifted by 90° with respect to the first demodulation signal, to generate a quadrature signal from the sensor signal;
- determining whether the quadrature signal or a signal derived therefrom is subject to a periodic oscillation; and
- if such a periodic oscillation is present, outputting a status signal having a value which indicates that the instantaneous rate signal is influenced by an external interference acting on the sensor.

In this method, it is advantageous that the rate signal is subjected to a correction if the status signal's value indicates that the instantaneous rate signal is influenced by an external interference acting on the sensor. This may be performed in that the following steps are further provided in the method:
- phase-shifting the quadrature signal by 90° and generating a quadrature signal phase-shifted by 90°;
- generating a differential signal by calculating the difference between the phase-shifted quadrature signal and the rate signal; and
- outputting the rate signal or the differential signal calculated by the subtracter as a function of the status signal.

BRIEF DESCRIPTION OF THE DRAWINGS

FIGS. 7a and 7b are graphs which show the sensor behavior according to the second example embodiment of the yaw rate sensor in the event of an interfering acceleration.

DETAILED DESCRIPTION

First Exemplary Embodiment

Figure 1:
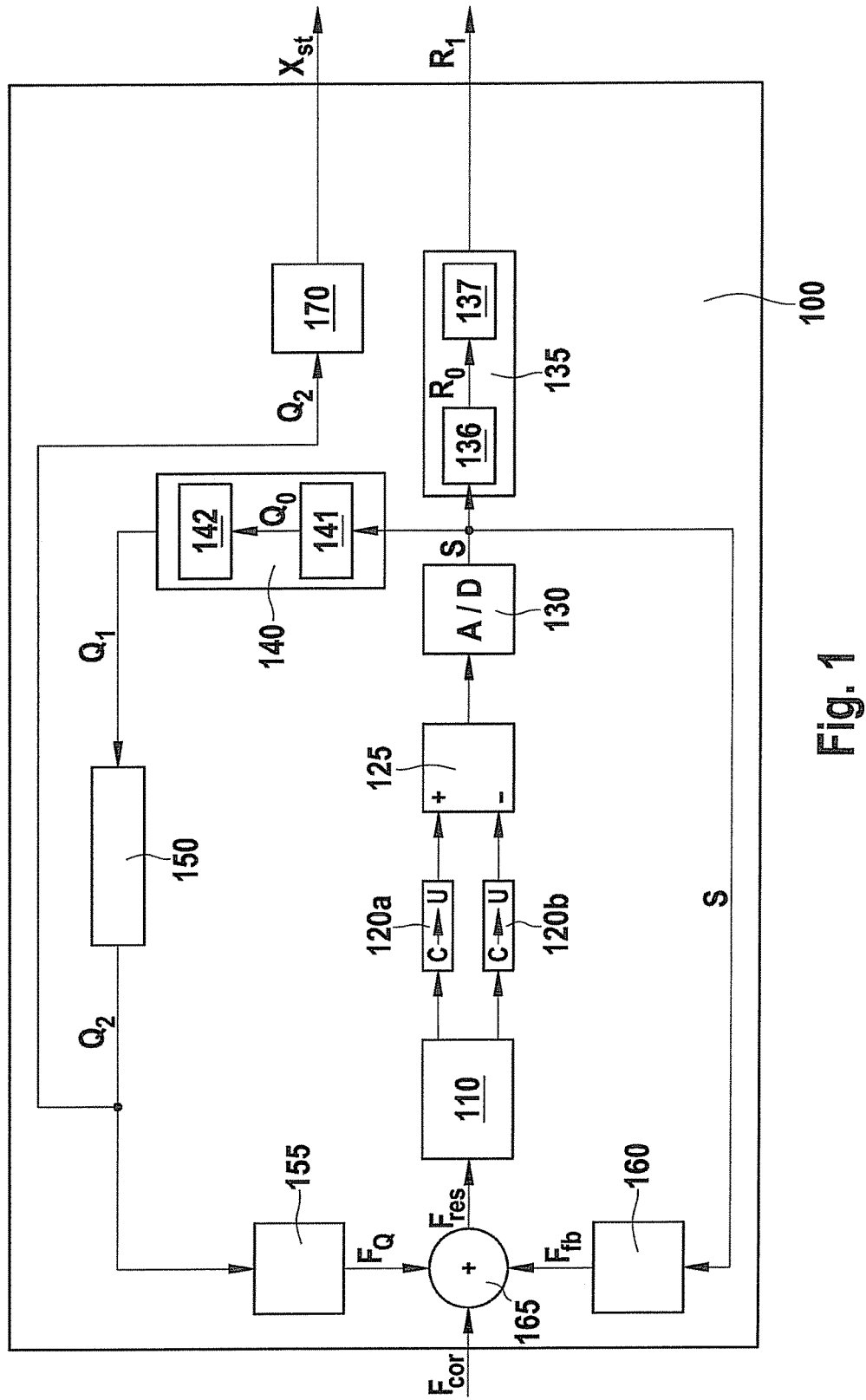
FIG. 1 is a block diagram, which shows a yaw rate sensor system according to a first example embodiment of the present invention.

FIG. 1 is a block diagram which shows the system of a yaw rate sensor 100 according to the present invention as per a first exemplary embodiment.

The core of sensor 100 is an oscillation mechanism 110. When sensor 100 is pivoted around a specific rotational axis, Coriolis forces act on the measuring electrodes provided in oscillation mechanism 110, which result in a local displacement of the measuring electrodes. This local displacement is measured capacitively and converted as explained below into a rate signal $R_1$, which contains information about the local displacement and therefore the yaw rate acting on the sensor. This is explained in greater detail hereafter.

Figure 2:
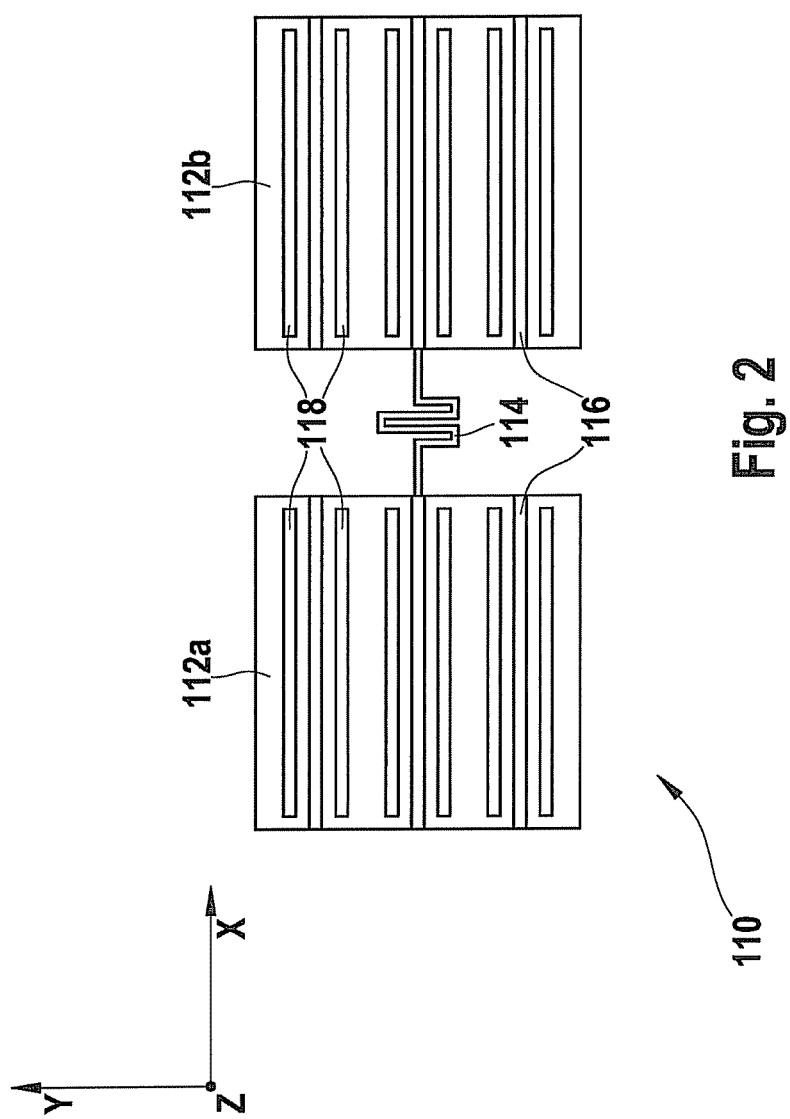
FIG. 2 is a schematic view of an oscillation mechanism according to an example embodiment of the present invention.

FIG. 2 is a schematic view of oscillation mechanism 110. In the present example, oscillation mechanism 110 is designed as a two-mass system having two linear oscillators 112a and 112b. The two linear oscillators 112a and 112b are mechanically coupled to one another via a spring 114.

Each of two linear oscillators 112a, 112b includes multiple actuator electrodes 116, which are provided on an oscillating body, which may be set into oscillation in relation to a substrate at a drive frequency $f_x$. The number of actuator electrodes 116 is not limited to the number shown in FIG. 2. Actuator electrodes 116 form an electrode lattice. One or more stator electrodes 118, which are provided on the substrate situated parallel to actuator electrodes 116, are assigned to each of actuator electrodes 116. Each of actuator electrodes 116 therefore generates, together with stator electrodes 118 assigned thereto, capacitors, which are each made of one actuator electrode 116 and at least one stator electrode 118.

Actuator electrodes 116 are mounted so they are movable in relation to stator electrodes 118 along the X axis. When oscillation mechanism 110 is set into oscillation, actuator electrodes 116 therefore move along the X axis, actuator electrodes 116 moving linear oscillators 112a and 112b antiparallel to one another in the +X or −X direction. The parts of linear oscillators 112a and 112b which may be set into oscillation in relation to the substrate are also referred to hereafter as "oscillating bodies."

If linear oscillators 112a, 112b are rotated around the Z axis, a Coriolis force $F_{cor}$ acts on moved actuator electrodes 116. Coriolis force $F_{cor}$ results in forces at frequencies $f_x-f_d$ and $f_x+f_d$ (where $f_x$=drive frequency and $f_d$=frequency of the applied yaw rate), which act in the Y direction and change the distance between actuator electrodes 116 and stator electrodes 118. The capacitance of the capacitors generated by actuator electrodes 116 and stator electrodes 118 therefore also changes. This capacitance change is converted by capacitance meters 120a and 120b (FIG. 1) into corresponding voltage signals. Capacitance meter 120a is assigned to the capacitances on linear oscillator 112a and capacitance meter 120b is assigned to the capacitances on linear oscillator 112b. Capacitance meters 120a, 120b each outputs a voltage signal which corresponds to the corresponding capacitance on assigned linear oscillator 112a or 112b. The voltage signals output by capacitance meters 120a, 120b are subtracted from one another by a subtracter 125. The analog differential signal which is output by subtracter 125 is converted by an analog-digital converter 130 into a digital sensor signal S.

A/D converter 130 therefore outputs a digital signal S, which contains information about the rotational forces acting on sensor 100. This signal S contains a rate component and a quadrature component phase-shifted thereto. The rate component is proportional to the velocity of the oscillating body, while, in contrast, the quadrature component is proportional to the deflection of the oscillating body. The rate component and the quadrature component are thus phase-shifted by precisely 90°. The quadrature component arises because of manufacturing tolerances or asymmetries in oscillation mechanism 110, which may not be compensated for by subtracter 125.

Sensor signal S is supplied to a rate demodulator 135, which demodulates sensor signal S by rate. Rate demodulator 135 includes a multiplier 136 and a low-pass filter 137. Multiplier 136 multiplies sensor signal S by a first demodulation signal. This first demodulation signal is proportional to $\cos(2\pi f_x t)$, for example, and is synchronized with the drive of the oscillation mechanism. A rate signal $R_0$ having two sidebands thus arises, one of which is in or close to the baseband. Through subsequent filtering using low-pass filter 137, a low-pass-filtered rate signal $R_1$ may therefore be obtained, which contains information about the yaw rate applied to the sensor, and is output by the sensor. For this purpose, rate signal $R_1$ may be digitally amplified, offset-corrected, and subsequently filtered through a filter. The acquired information may be output by the sensor, for example, and processed further in an ESP system, a rollover sensing system, or also in a navigation system, or also used for decision-making. For example, an ESP system may ensure the driving stability of the vehicle in critical driving situations through controlled braking interventions on the basis of the ascertained yaw rate and further information such as steering angle, wheel speed, and acceleration.

Sensor signal S is further supplied to a quadrature demodulator 140, which includes a multiplier 141 and a low-pass filter 142. Multiplier 141 multiplies sensor signal S by a second demodulation signal, whereby signal $Q_0$ results. This second demodulation signal is phase-shifted by 90° with respect to the first demodulation signal and is therefore proportional to $\sin(2\pi f_x t)$, for example. Signal $Q_0$ demodulated according to quadrature therefore results essentially as:

$$Q_0(t) = Y[x_0 \cdot \cos(2\pi \cdot f_x \cdot t)] \cdot [\Omega \cdot \cos(2\pi \cdot f_d \cdot t)] \cdot [\sin(2\pi \cdot f_x \cdot t)] \quad (1)$$

$$= Y \cdot x_0 \cdot [\Omega \cdot \cos(2\pi \cdot f_d \cdot t)] \cdot \frac{1}{2}\sin(2\pi \cdot f_x \cdot t)$$

$$= Y \cdot x_0 \cdot \Omega \cdot \frac{1}{4} \cdot (\sin(2\pi \cdot (2f_x - f_d) \cdot t) + \sin(2\pi \cdot (2f_x + f_d) \cdot t))$$

where:
Y: proportionality factor;
$x_0$: drive amplitude;
$f_x$: drive frequency;
$f_d$: frequency of the yaw rate; and
$\Omega$: amplitude of the yaw rate.

This signal $Q_0$ therefore normally includes essentially no spectral components in the baseband after the demodulation, but is rather primarily close to twice the drive frequency ($2f_x$) of the sensor element.

Signal $Q_0$ is supplied to a low-pass filter 142, which may, for example, have the same bandwidth as the low-pass filter provided downstream from demodulator 135 (e.g., 50 Hz or 100 Hz). Low-pass filter 142 therefore outputs a low-pass-filtered quadrature signal $Q_1$, from which the signal components around twice drive frequency ($2f_x$) are filtered out.

This low-pass-filtered quadrature signal $Q_1$ is supplied to a quadrature controller 150. The quadrature controller 150 generates a feedback signal $Q_2$, using which oscillation mechanism 110 is influenced and which is set up in such a way that quadrature signal Q is essentially regulated to zero in operation. In other words, quadrature controller 150 attempts to regulate quadrature signal $Q_1$ to zero in operation. A quadrature controller 150 may be implemented as a PID-controller, for example.

Feedback signal $Q_2$ is a voltage which is applied to Q-electrodes 155 on the oscillating body and the substrate of oscillation mechanism 110. An electrostatic force $F_Q$ which acts on the oscillating body is generated by this voltage at Q-electrodes 155.

Furthermore, sensor signal S arising at the output of the A/D converter is fed back and applied at feedback electrodes 160 to the oscillating body and the substrate of oscillation mechanism 110. An electrostatic force $F_{fb}$ which acts on the oscillating body is thus generated at feedback electrodes 160.

Electrostatic forces $F_Q$ and $F_{fb}$ are superimposed on Coriolis force $F_{cor}$ acting on the oscillating body and generate resulting force $F_{res} = F_{cor} + F_Q + F_{fb}$, which is schematically shown in the block diagram by adder 165. Adder 165 thus does not represent an actual component, but rather merely schematically symbolizes the superposition of the various force vectors.

A control loop is thus provided, which includes oscillation mechanism 110 including the oscillating body, Q-electrodes 155, and feedback electrodes 160, as well as capacitance meters 120a, 120b, subtracter 125, A/D converter 130, demodulator 140, and quadrature controller 150.

Sensor 100 also includes an analysis circuit 170, which analyzes feedback signal $Q_2$ and outputs a status signal $X_{st}$ derived therefrom. More precisely, analysis circuit 170 determines whether feedback signal $Q_2$ is subject to a periodic oscillation. If feedback signal $Q_2$ is subject to a periodic oscillation, analysis circuit 170 outputs a status signal $X_{st}$ whose value (e.g., $X_{st}$=HI) indicates that the instantaneous rate signal $R_1$ is influenced by an interfering acceleration or vibration acting on the sensor. In other words, status signal $X_{st}$ marks the sensor signal as flawed. If analysis circuit 170 determines that feedback signal $Q_2$ is not subject to a periodic oscillation, it outputs a status signal $X_{st}$ whose value (e.g., $X_{st}$=LO) indicates that the instantaneous rate signal $R_1$ is not subject to error.

Figure 3A:
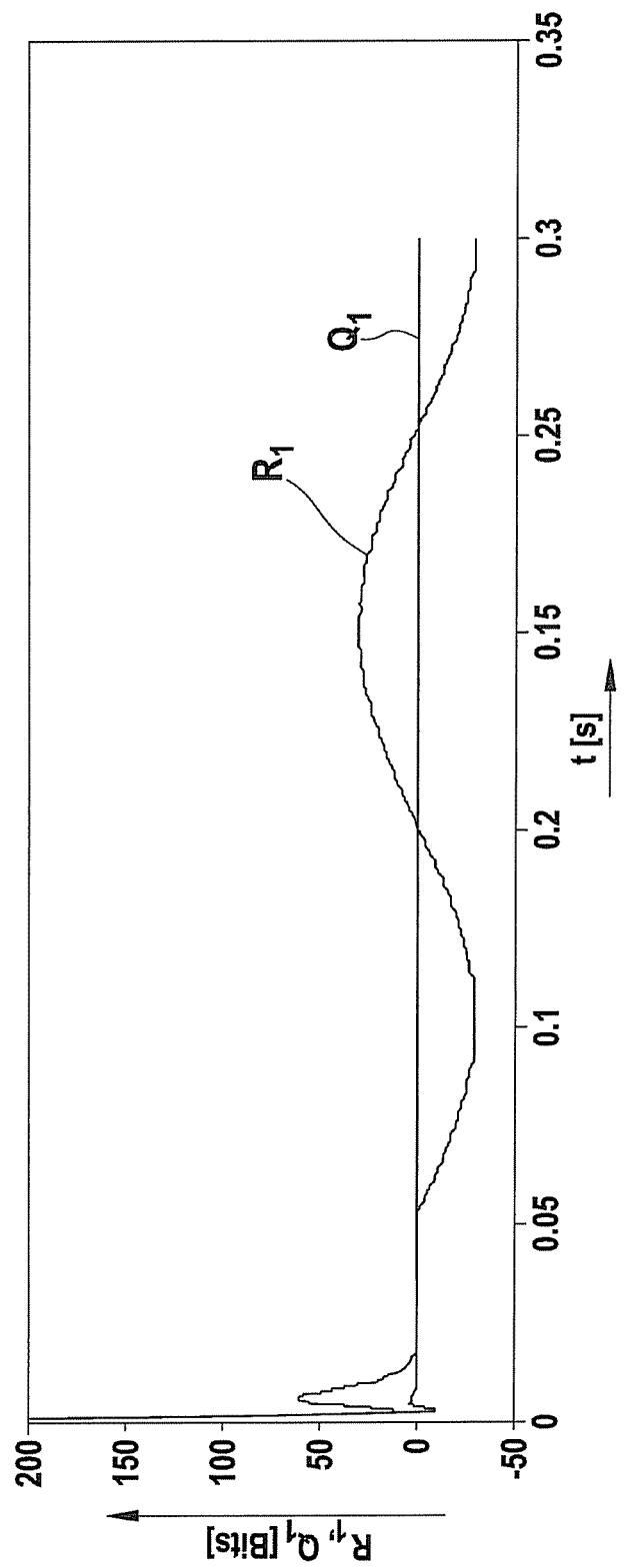
FIGS. 3a and 3b are graphs which illustrate the sensor behavior in a sensor according to the first example embodiment without the presence of an interfering acceleration.
Figure 3B:
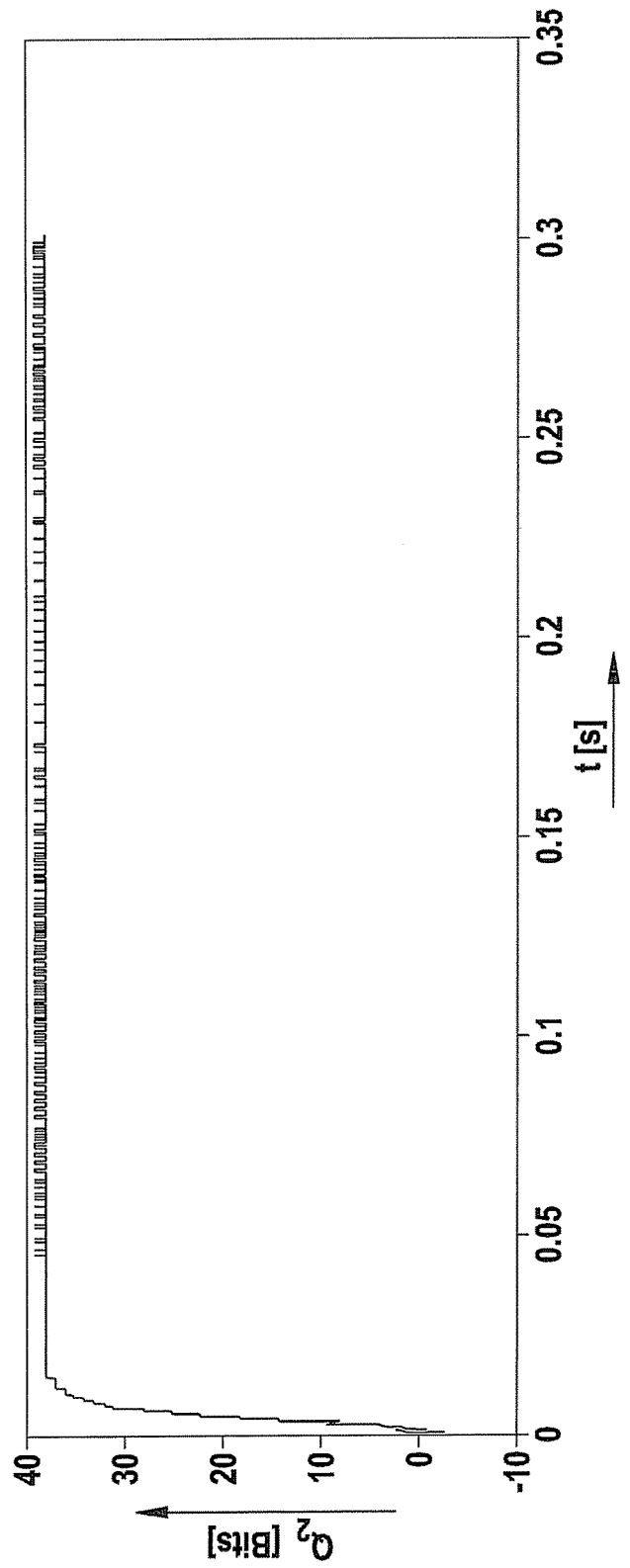

FIGS. 3A and 3B illustrate the behavior of sensor 100 in operation for the case in which sensor 100 is rotated starting at time t=0.05 s at a yaw rate whose amplitude $\Omega$ is approximately 120°/s and whose rotational frequency $f_d$ is approximately 5 Hz, and in which no interfering acceleration acts on sensor 100. More precisely, FIG. 3A is a graph which shows the curve of signals $R_1(t)$ and $Q_1(t)$, while FIG. 3B shows the curve of feedback signal $Q_2(t)$. The horizontal axis of each of FIGS. 3A and 3B is the time axis, and the vertical axis of each of FIG. 3A or 3B shows the value of the signals in bits. This also applies similarly to FIGS. 4A, 4B, 7A, and 7B.

Sensor 100 is subject, as expected, to a transient effect, which lasts less than 0.05 s here. At the end of the transient effect, both $R_1$ and also $Q_1$ are regulated to approximately 0, which indicates that no rotational acceleration acts on sensor 100. Output signal $Q_2$ of the quadrature controller has assumed a constant value at this time. If a rotational acceleration having a rotational frequency $f_d$ of 5 Hz acts on sensor 100, the resulting Coriolis force causes a change of rate signal $R_1$ at the same frequency in the way described above. The amplitude of rate signal $R_1$ corresponds to the amplitude of the rotational acceleration. By analyzing rate signal $R_1$, the amplitude and frequency of the rotary motion may thus be inferred.

Because of the regulation using quadrature controller 150, quadrature signal $Q_1$ remains at near zero. Signal $Q_2$ displays typical controller behavior. It is not subject to periodic oscillation. Therefore, analysis circuit 170 outputs a status signal $X_{st}$ having the value "LO," which indicates that the sensor is not subject to external vibration interference.

Figure 4A:
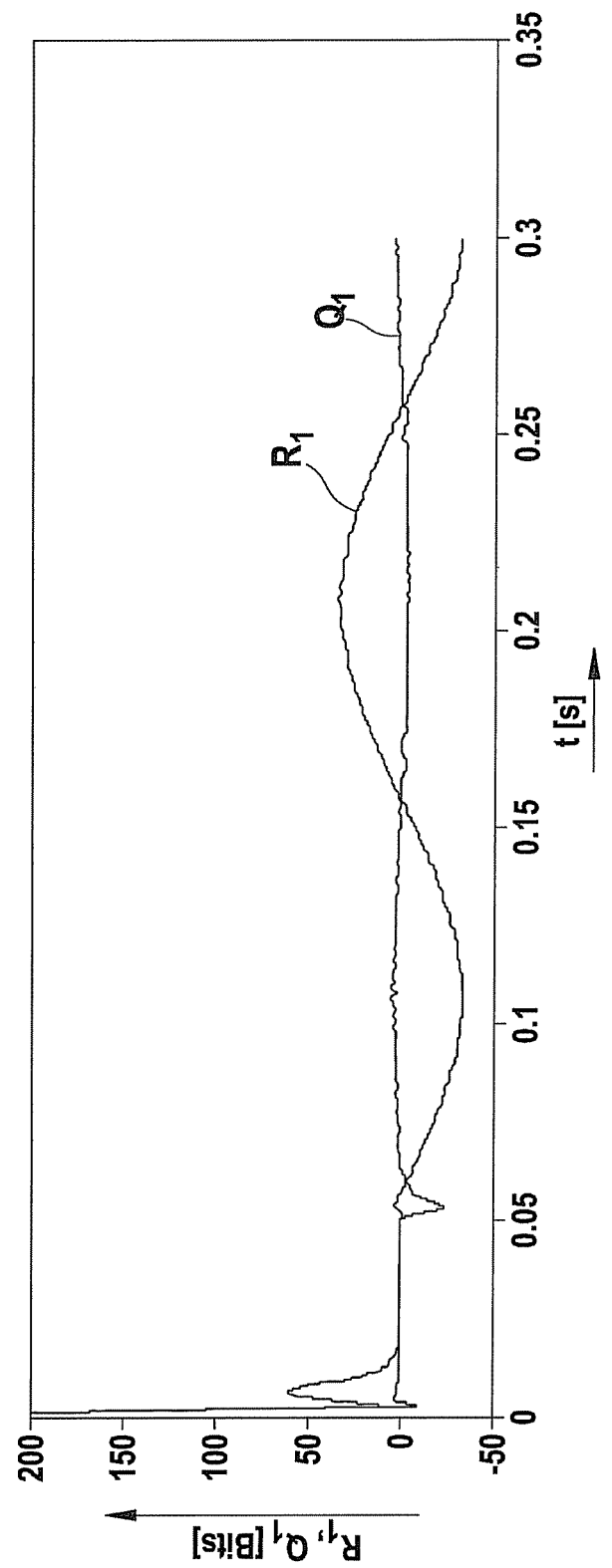
FIGS. 4a and 4b are graphs which show the sensor behavior according to the first example embodiment in the event of an interfering acceleration.
Figure 4B:
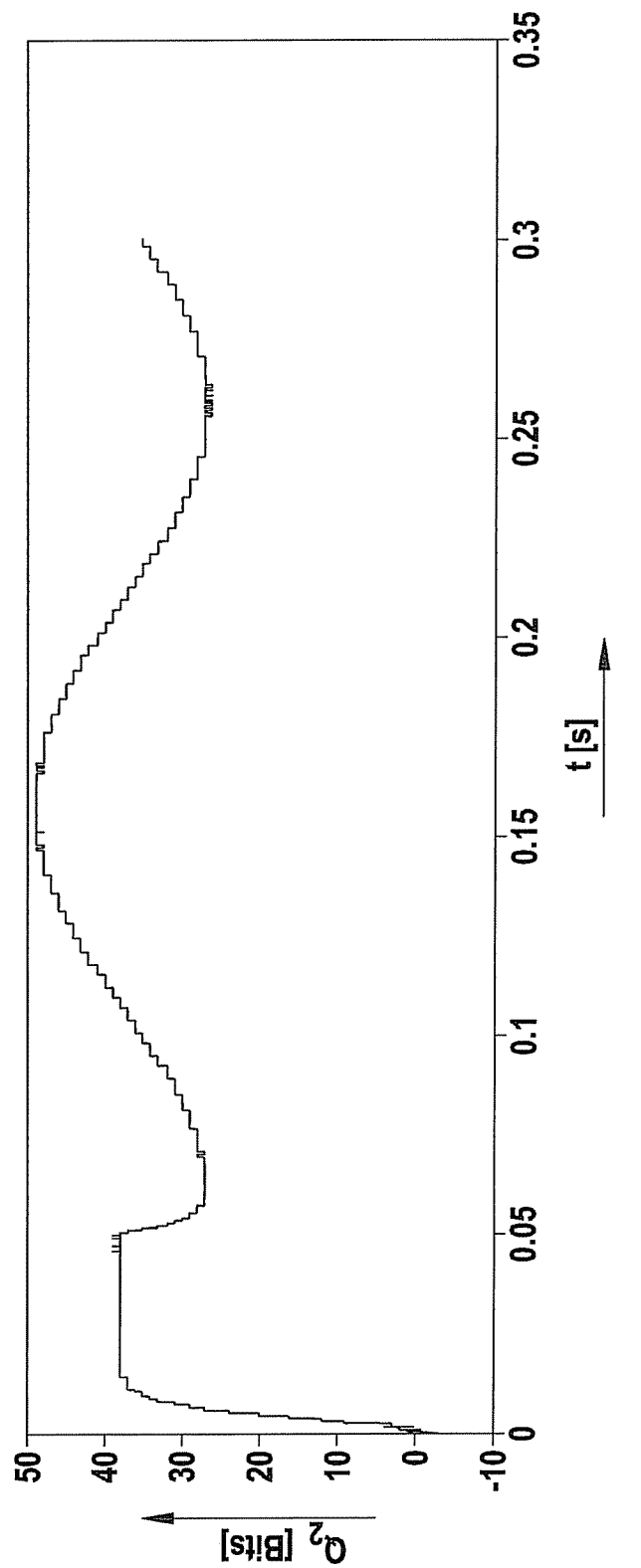

FIGS. 4A and 4B illustrate the behavior of sensor 100 in operation for the case in which sensor 100 is not rotated, but rather a vibration having an interfering frequency $f_x+f_s$ acts on sensor 100. In this case, signal $Q_0$ demodulated according to quadrature results as:

$$Q_0(t) = X[A \cdot (\sin(2\pi \cdot (2f_x + f_s) \cdot t)][\sin(2\pi \cdot f_x \cdot t)] \quad (2)$$

$$= X \cdot A \cdot \frac{1}{2} \cdot (\cos(2\pi \cdot f_s \cdot t) - \cos(2\pi \cdot (2f_x + f_s) \cdot t))$$

where:
X: proportionality factor;
A: amplitude of the external interfering acceleration;
$f_x$: drive frequency; and
$f_x+f_s$: frequency of the external interfering acceleration.

This signal $Q_0(t)$ is input into low-pass filter 142. The second term on the right side of the second line in equation (2) corresponds to a high-frequency component, which is more than twice as large as drive frequency $f_x$. However, the first term (proportional to $\cos(2\pi f_s t)$) is then not filtered out by low-pass filter 142 when frequency $f_s$ is small. This is the case in particular if the frequency of the external interfering acceleration is equal to drive frequency $f_x$ plus/minus a frequency $f_s$ less than the cutoff frequency of low-pass filter 142.

This situation is shown in FIGS. 4A and 4B. Starting at time t=0.05 s, an external acceleration ($f_s$=5 Hz, A=2 g) is provided in detection direction on sensor 100. Because of asymmetries in the sensor, a digitized, periodic quadrature signal $Q_1$ having frequency $f_s$ arises. This periodic signal $Q_1$ is supplied to quadrature controller 150. Quadrature controller 150 attempts to regulate the signal to zero, so that feedback signal $Q_2$ also begins to oscillate at frequency $f_s$. This signal $Q_2$ acts on the Q-electrodes and therefore induces a periodic electrostatic force on the oscillating body. This is in turn converted into a periodic rate signal $R_1$, which oscillates at a specific amplitude (approximately 33 bits here), although no yaw rate acts on the sensor.

Feedback signal $Q_2$ is supplied to analysis circuit 170, which determines that feedback signal $Q_2$ is subject to a periodic oscillation and therefore outputs a status signal $X_{st}$ whose value (e.g., "HI") indicates that rate signal $R_1$, which is generated by the sensor, is subject to error.

Figure 5:
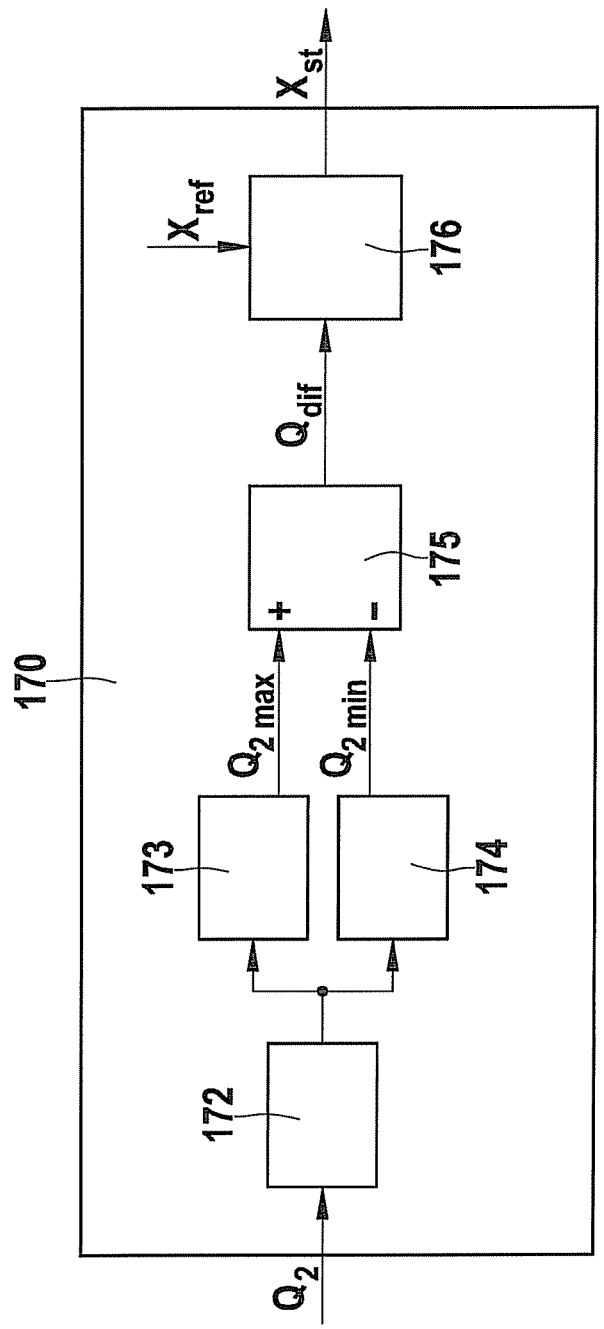
FIG. 5 is a block diagram of an analysis circuit according to an example embodiment of the present invention.

FIG. 5 shows a more detailed view of an example embodiment of analysis circuit 170. In this example, analysis circuit 170 includes a high-pass filter 172 (a bandpass filter may alternatively also be provided), two peak-hold circuits 173, 174, a subtracter 175, and a comparator 176. Feedback signal $Q_2$ is supplied to high-pass filter 172. Signal $Q_2$, which is high-pass filtered by high-pass filter 172, is supplied to both peak-hold circuits 173, 174. Peak-hold circuit 173 determines maximum value $Q_{2max}$, which high-pass-filtered $Q_2$ assumes in a rolling timeslot, while in contrast peak-hold circuit 174 determines minimal value $Q_{2min}$, which high-pass-filtered signal $Q_2$ assumes in this timeslot. Subtracter 175 subtracts value $Q_{2min}$ from value $Q_{2max}$ and thus determines a differential signal $Q_{dif}$, which corresponds to the peak-to-peak distance in the observed time slot. Comparator 176 compares signal $Q_{dif}$ to a predetermined or dynamically determined reference value $X_{ref}$. If $Q_{dif}$ is greater than reference value $X_{ref}$, comparator 176 outputs a status signal $X_{st}$ having value "HI," which indicates that rate signal $R_1$ output by sensor 100 is influenced by an external interference. Otherwise, the comparator outputs a status signal $X_{st}$ having value "LO."

The above-described embodiment of analysis circuit 170 is only exemplary and any suitably appropriate analysis circuit may be used which is capable of recognizing a periodic oscillation of feedback signal $Q_2$. Furthermore, the analysis circuit may also be supplemented by elements which ensure that status signal $X_{st}$ is only set to "HI" if an oscillation around the approximately constant value actually exists after the transient effect, i.e., if $Q_{2min}$ is less than this value and $Q_{2max}$ is greater than this value.

Second Exemplary Embodiment

Figure 6:
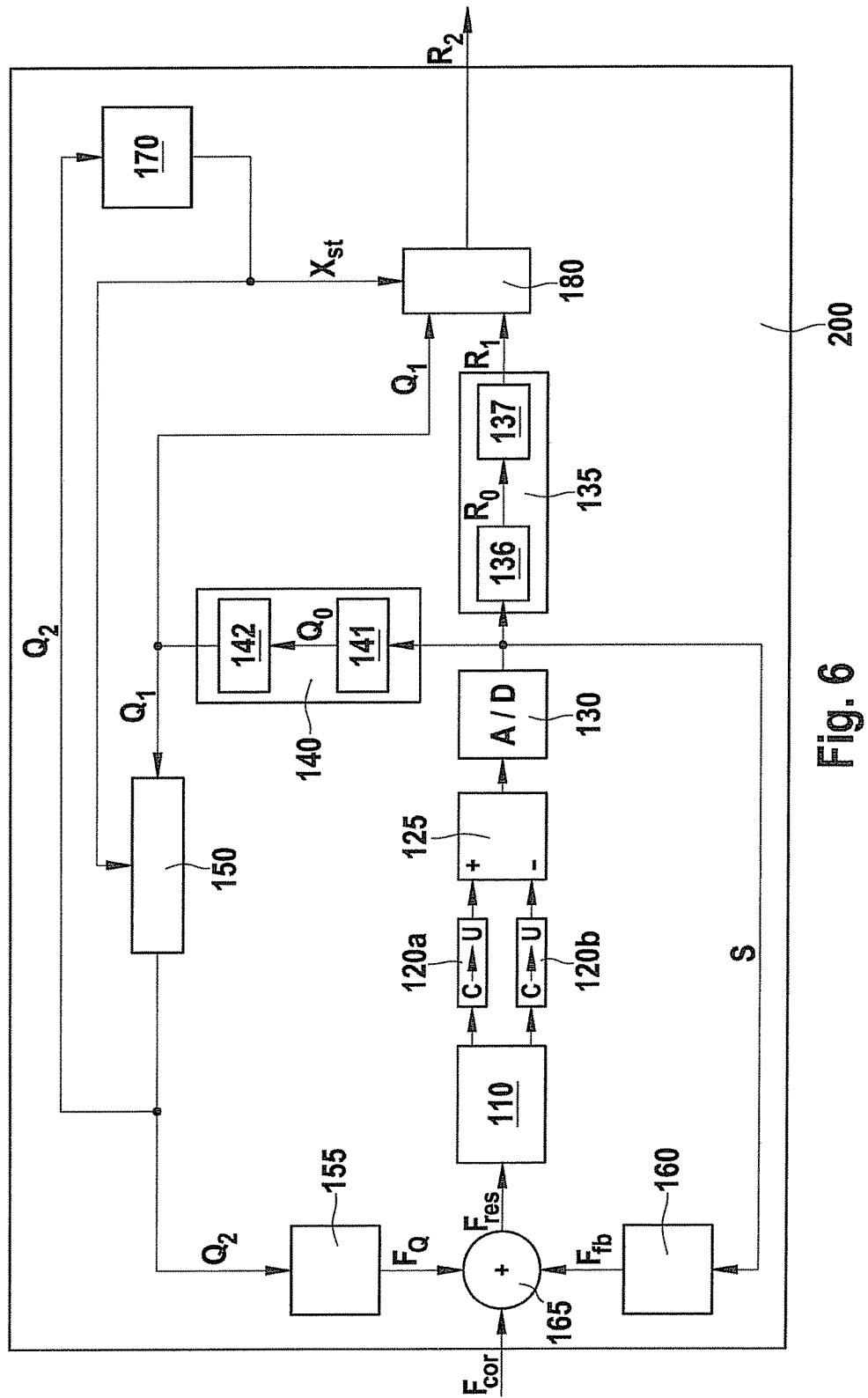
FIG. 6 is a block diagram which shows a yaw rate sensor system according to a second example embodiment of the present invention.

FIG. 6 is a block diagram which explains the system of a sensor 200 according to the present invention as per a second exemplary embodiment.

Components which correspond to those of sensor 100 of the first exemplary embodiment in FIG. 1 are identified by identical reference numerals and are not explained in greater detail. Sensor 200 in FIG. 6 differs from sensor 100 according to the first exemplary embodiment in that a correction circuit 180 is further provided, to which rate signal $R_1$ and quadrature signal $Q_1$ are supplied, and which outputs a corrected rate signal $R_2$. More precisely, correction circuit 180 outputs rate signal $R_1$ unchanged if the value of status signal $X_{st}$ is "LO," and outputs a corrected rate signal if the value of status signal $X_{st}$ is "HI."

Furthermore, in this embodiment, in contrast to the first embodiment, the regulation using quadrature controller 150 is stopped as soon as status signal $X_{st}$ marks a faulty rate signal $R_1$. For this purpose, status signal $X_{st}$ output by analysis circuit 170 is also supplied to quadrature controller 150. When status signal $X_{st}$ jumps from LO to HI, i.e., in other words when status signal $X_{st}$ assumes a value which indicates that instantaneous rate signal $R_1$ is influenced by an external interference acting on the sensor, quadrature controller 150 clamps feedback signal $Q_2$ at its instantaneous value, i.e., at the value at the moment of the transition from LO to HI. This prevents the periodic oscillation of feedback signal $Q_2$ from influencing rate signal $R_1$. If status signal $X_{st}$ jumps back to a value which does not indicate an error in instantaneous rate signal $R_1$, quadrature controller 150 is activated again.

Figure 7A:
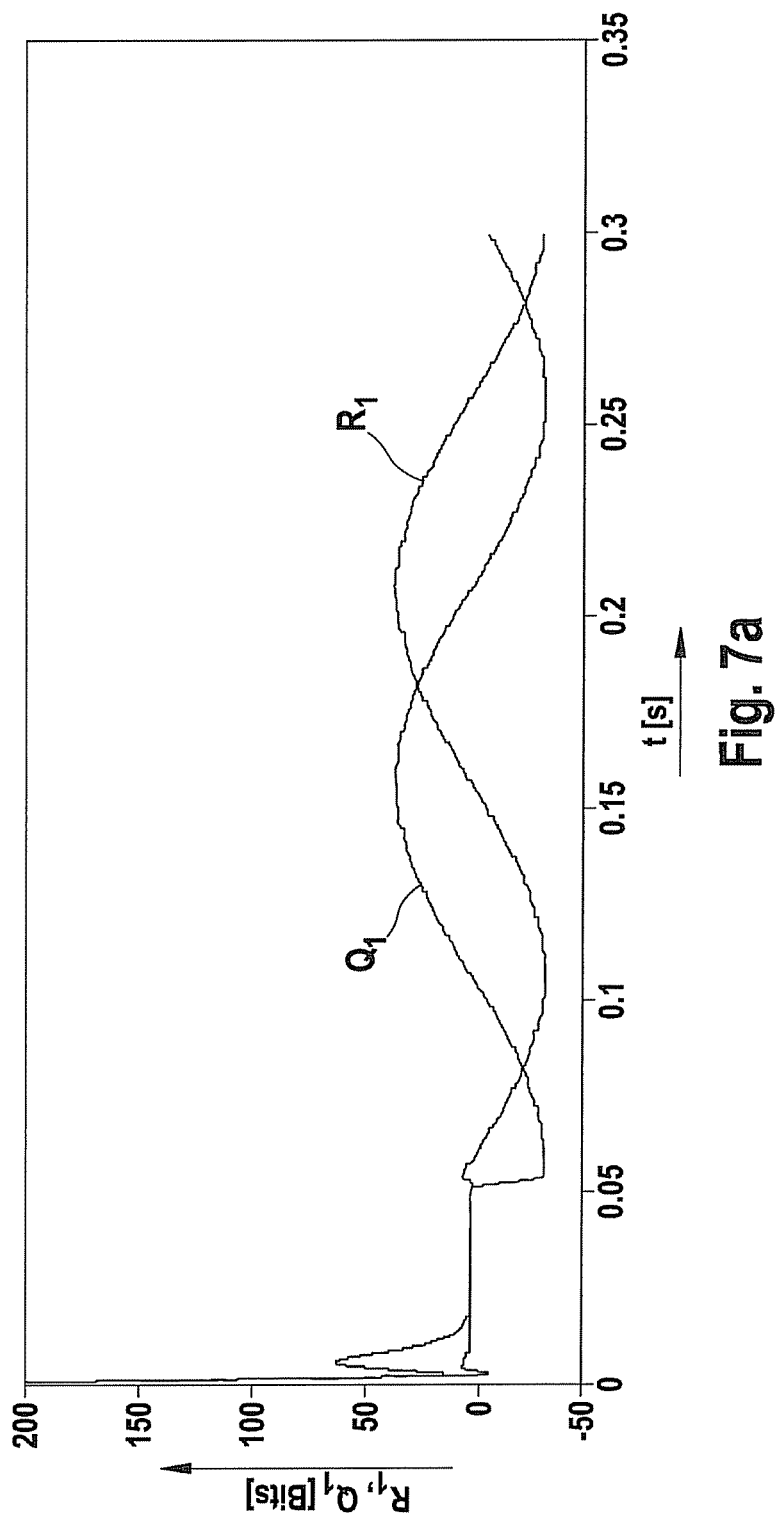

FIGS. 7A and 7B illustrate the behavior of sensor 200 for the case of an external vibration interference having frequency $f_x+f_s$, which is applied to the sensor from 0.05 s. Feedback signal $Q_2$ is kept constant after the transient process in this example (see FIG. 7B). As is recognizable in FIG. 7A, in the case of this external vibration interference, periodically oscillating signals $R_1$ and $Q_1$ exist, which are phase-shifted by 90° with respect to one another, but have essentially the same amplitude. Sensor 200 makes use of this fact to correct rate signal $R_1$.

Figure 8:
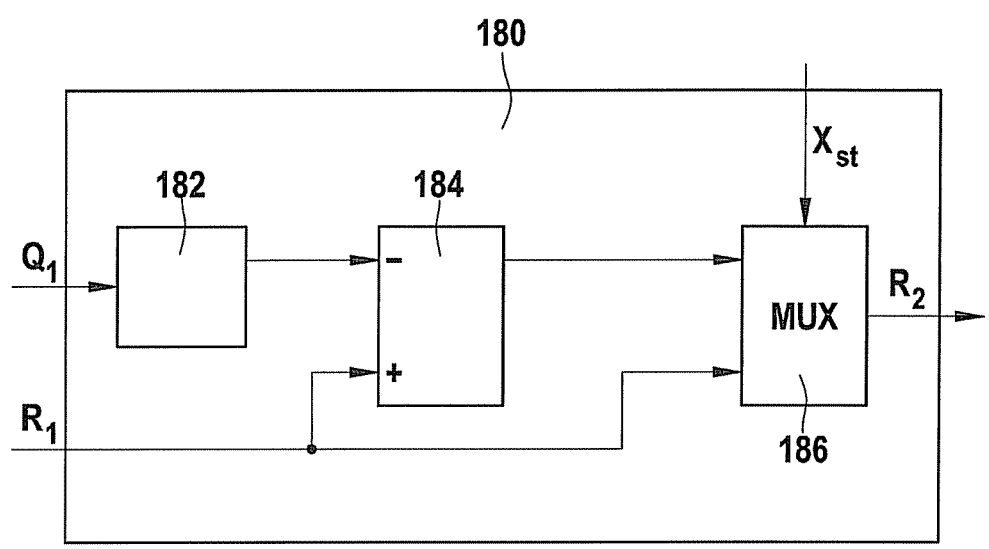
FIG. 8 is a block diagram which schematically shows the construction of a correction circuit according to an example embodiment of the present invention.

FIG. 8 is a block diagram which schematically shows the construction of correction circuit 180. Correction circuit 180 includes a phase shifter 182, a subtracter 184, and a multiplexer 186. Phase shifter 182 shifts signal $Q_1$ supplied thereto by +90°. This phase shifter 182 may be implemented, for example, by a shift register, a delay element, or the like.

Signal $Q_1$, which is phase-shifted by +90°, is supplied, as is rate signal $R_1$, to subtracter 184, which subtracts phase-shifted signal $Q_1$ from rate signal $R_1$. The differential signal output by subtracter 184 is therefore a corrected signal, in which the errors caused by the interfering acceleration or vibration have been compensated for. The differential signal output by subtracter 184 is supplied, as is rate signal $R_1$, to multiplexer 186. Furthermore, status signal $X_{st}$ is supplied as a control signal to multiplexer 186. If status signal $X_{st}$ is "LO," correction circuit 180 outputs unchanged rate signal $R_1$ as output signal $R_2$. If status signal $X_{st}$ is "HI," correction circuit 180 outputs corrected rate signal $R_1$, i.e., the differential signal output by subtracter 184.

Using this system, in case of an external vibration interference, status signal $X_{st}$ assumes the value "HI," and output rate signal $R_1$ is automatically corrected. If the vibration interference decays, feedback signal $Q_2$ is thus also no longer periodic, so that status signal $X_{st}$ again assumes the value "LO," and uncorrected rate signal $R_1$ is output by correction circuit 180.

Although the invention is described above on the basis of preferred exemplary embodiments, it is not restricted thereto, but rather may be modified in manifold ways. In particular, various features of the above-described embodiments are combinable with one another.

For example, the sensor is not restricted to a yaw rate sensor. Rather, the principle according to the present invention is applicable to all sensors in which a sensor signal is demodulated by rate and quadrature. Furthermore, in the case of a yaw rate sensor, there is no restriction to linear oscillators; rather, the present invention may also be applied to rotating oscillators.

Furthermore, the above exemplary embodiments were explained for the case in which an A/D converter 130 generates a digital sensor signal, which is then processed further. However, it is also instead possible that the sensor generates an analog signal and this signal is processed further in analog form. In this context, it is to be noted that the further processing of sensor signal S was shown using discrete components (demodulators 135, 140, filters 137, 142, etc.). These components may also be implemented with the aid of a program-controlled processor, however, in particular as an ASIC. Therefore, they do not necessarily have to be implemented as discrete components.

What is claimed is:

1. A sensor for measuring a measured variable, the sensor being configured to generate a sensor signal and including a component that oscillates at a drive frequency, the sensor comprising:
   a rate demodulator configured to demodulate the sensor signal by multiplying it by a first demodulation signal to generate a rate signal, the rate signal providing information about the measured variable;
   a quadrature demodulator configured to demodulate the sensor signal by multiplying it by a second demodulation signal to generate a quadrature signal, the second demodulation signal being offset by 90° with respect to the first demodulation signal; and
   an analysis circuit configured to:
      determine whether at least one of the quadrature signal and a signal derived from the quadrature signal is subject to a periodic oscillation; and
      responsive to determining in the determination step that the at least one of the quadrature signal and the derived signal is subject to the periodic oscillation, output a status signal whose value indicates that the rate signal is influenced by an external interference acting on the sensor.

2. The sensor as recited in claim 1, further comprising:
   a quadrature controller configured to receive the quadrature signal and generate the derived signal, the derived signal being fed back into the sensor to regulate the quadrature signal to approximately zero, wherein the analysis circuit is configured to determine whether the derived signal is subject to the periodic oscillation.

3. The sensor as recited in claim 2, wherein the sensor is configured for the status signal to be supplied to the quadrature controller, and the quadrature controller is configured to hold the derived signal at its current value in response to a jump of the status signal to a value that indicates that the rate signal is influenced by an external interference acting on the sensor.

4. The sensor as recited in claim 1, further comprising:
   a correction circuit to which the status signal and the rate signal are supplied, and which, is configured to subject the rate signal to a correction where the value of the status signal indicates that the rate signal is influenced by the external interference acting on the sensor.

5. The sensor as recited in claim 4, wherein the correction circuit comprises:
   a phase shifter configured to phase-shift the quadrature signal by 90°, and output the 90° phase-shifted quadrature signal;
   a subtracter configured to calculate a difference between the phase-shifted quadrature signal and the rate signal, and output a result of the calculation as a differential signal; and
   a multiplexer configured to:
      select one of the rate signal and the differential signal depending on the value of the status signal; and
      output the selected one of the rate signal and the differential signal.

6. The sensor as recited in claim 1, wherein the sensor is a yaw rate sensor, and the component is an oscillating body configured to oscillate in relation to a substrate at the drive frequency.

7. A method of a hardware-implemented sensor that measures a measured variable and that includes a component configured to oscillate at a drive frequency, the method comprising:

generating a sensor signal;
demodulating the sensor signal by multiplying it by a first demodulation signal to generate a rate signal, the rate signal providing information about the measured variable;
demodulating the sensor signal by multiplying it by a second demodulation signal to generate a quadrature signal, the second demodulation signal being shifted by 90° with respect to the first demodulation signal;
determining whether at least one of the quadrature signal and a signal derived from the quadrature signal is subject to a periodic oscillation; and
responsive to determining in the determination step that the at least one of the quadrature signal and the derived signal is subject to the periodic oscillation, outputting a status signal whose value which indicates that the instantaneous rate signal is influenced by an external interference acting on the sensor.

8. The method as recited in claim 7, further comprising:
where the value of the status signal indicates that the instantaneous rate signal is influenced by the external interference acting on the sensor, correcting the rate signal.

9. The method as recited in claim 8, further comprising:
phase-shifting the quadrature signal by 90°;
calculating a difference between the phase-shifted quadrature signal and the rate signal to obtain a differential signal;
selecting one of the rate signal and the differential signal depending on the value of the status signal; and
outputting one of the rate signal and the differential signal.

10. The method as recited in claim 7, wherein the sensor is a yaw rate sensor and the component is an oscillating body configured to oscillate in relation to a substrate at the drive frequency.

* * * * *